(12) United States Patent
Sander et al.

(10) Patent No.: US 11,143,311 B2
(45) Date of Patent: Oct. 12, 2021

(54) VALVE SEAT AND CAGE ASSEMBLY

(71) Applicant: SAMSON AKTIENGESELLSCHAFT, Frankfurt am Main (DE)

(72) Inventors: Andreas Sander, Laudenbach (DE); Michael Merscher, Roedermark (DE)

(73) Assignee: SAMSON AG, Frankfurt am Main (DE)

( * ) Notice: Subject to any disclaimer, the term of this patent is extended or adjusted under 35 U.S.C. 154(b) by 0 days.

(21) Appl. No.: 16/798,360

(22) Filed: Feb. 22, 2020

(65) Prior Publication Data
US 2020/0271230 A1    Aug. 27, 2020

(30) Foreign Application Priority Data
Feb. 22, 2019   (DE) .......................... 102019104589.4

(51) Int. Cl.
*F16K 1/42*       (2006.01)
*F16K 3/24*       (2006.01)
(Continued)

(52) U.S. Cl.
CPC ................ *F16K 1/422* (2013.01); *F16K 1/42* (2013.01); *F16K 3/246* (2013.01); *F16K 25/00* (2013.01); *F16K 27/02* (2013.01)

(58) Field of Classification Search
CPC .......... F16K 1/422; F16K 25/00; F16K 27/02; F16K 3/246; F16K 1/42
See application file for complete search history.

(56) References Cited

U.S. PATENT DOCUMENTS 7,854,239 B2    12/2010   Wears et al.
8,167,269 B2    5/2012    Bell et al.
(Continued)

FOREIGN PATENT DOCUMENTS

WO    2011008379    1/2011
WO    2016058874    4/2016

OTHER PUBLICATIONS

German Patent and Trademark Office, Examination Report, dated Feb. 7, 2020, pp. 1-7, German Application No. 102019104589.4.
(Continued)

*Primary Examiner* — Marina A Tietjen
(74) *Attorney, Agent, or Firm* — Woodling, Krost and Rust

(57) ABSTRACT

The invention relates to a valve seat and cage assembly (18) comprising a valve cage (20) and a valve seat (22), the valve seat (22) being adapted to be screwed into the valve cage (20), which valve cage (20), in a connection portion (34) thereof, has a valve cage connection inner diameter ($D_K$) in which the connection portion (32) of a valve seat (22) engages with its valve seat connection outer diameter ($D_V$) and thus provides radial centering, a screw connection portion (37) and a shoulder (38), with the shoulder (38) serving as an axial stop between the valve cage and the valve seat, and with the valve seat (22) and the valve cage (20) being pressed against one another with an axial contact pressure component. The invention is characterized in that the screw-connection portion is located between the connection portion (32) and a shoulder (38), with the valve cage connection inner diameter ($D_K$) and the valve seat connection outer diameter ($D_V$) forming a fit with one another that will act to center the valve seat and the valve cage.

12 Claims, 4 Drawing Sheets

(51) Int. Cl.
 *F16K 27/02* (2006.01)
 *F16K 25/00* (2006.01)

(56) References Cited

U.S. PATENT DOCUMENTS

| | | |
|---|---|---|
| 9,297,469 B2 * | 3/2016 | Bell ........................ F16K 3/243 |
| 9,395,009 B2 | 7/2016 | Lovell |
| 9,732,873 B2 | 8/2017 | Dobbs et al. |
| 2006/0048826 A1 | 3/2006 | Gossett et al. |
| 2012/0319027 A1 | 12/2012 | Dobbs et al. |
| 2014/0264135 A1 | 9/2014 | Bell |
| 2015/0108378 A1 * | 4/2015 | Lovell ................... F16K 27/041 251/118 |
| 2019/0024803 A1 | 1/2019 | Sander |

OTHER PUBLICATIONS

European Patent Office, European Extended Search Report, European Patent Application No. 20159110, dated Jul. 2, 2020, pp. 1-11.

* cited by examiner

VALVE SEAT AND CAGE ASSEMBLY

This application claims the benefit and priority of and to German patent application No. 10 2019 104 589.4, filed Feb. 22, 2019. German patent application No. 10 2019 104 589.4, filed Feb. 22, 2019 is incorporated herein by reference hereto in its entirety.

The invention relates to a valve seat and cage assembly for use in a valve, in particular in a valve intended for use with very low or very high temperature process fluids, of the type specified in the preamble of claim 1.

In a generic valve for controlling a process fluid, also referred to as a cage valve, a valve cage is disposed in the transition from a valve inlet side to a valve outlet side. Guided in the valve cage and axially displaceable therein is a piston, with the position of the piston determining the opening width of the cage. In a manner known per se, the piston is connected to an actuator so as to be linearly movable, to enable the piston to change its position. In addition to the valve cage, a valve of this type also has a valve seat which seals the valve in a closed position thereof, in which position the piston comes to rest on the valve seat.

Especially for valves that are exposed to extreme fluid temperatures in operation and thus have the actual valve disposed at a large distance from the actuator, it is advantageous to connect the valve seat to the valve cage so that, during assembly, these two parts can be fitted into the valve housing together, as a valve seat and cage assembly.

US 2014/0264135 A1 discloses this type of valve with a valve seat and cage assembly comprising a valve cage and a valve seat, in which the valve seat is screwed into the valve cage. The valve seat is centered relative to the valve cage. For this purpose, a centering section is provided which extends opposite to the screw-in direction of the valve seat.

One shortcoming of this assembly is that in the screw-in direction, the thread is accessible to process fluid, which leads to the thread being exposed to the process fluid and thus makes the thread more difficult to unscrew, in particular when aggressive media are used.

It is the object of the invention to provide a valve seat and cage assembly in which the connection between the valve cage and the valve seat is better protected.

This object is accomplished by the characteristic features of claim 1 in conjunction with the features specified in its preamble.

The dependent claims relate to advantageous further embodiments of the invention.

In a manner known per se, the valve seat and cage assembly comprises a valve cage and a valve seat, with the valve seat being adapted to be screwed into the valve cage.

The valve cage has a connection portion of a valve cage connection inner diameter which will be engaged by a valve seat of a valve seat connection outer diameter during assembly of the valve seat and the valve cage. In addition, the valve seat and the valve cage have a screw-connection portion, said screw-connection portion being located between the connection portion and a shoulder at which the valve seat and the valve cage are pressed against each other with an axial contact pressure force component. This thus defines a final screwed-in position once both components abut on the shoulder.

In accordance with the invention, the screw-connection portion is located between the connection portion and the shoulder, and the invention further provides for the valve cage connection inner diameter and the valve seat connection outer diameter to be matched to one another for a fit so that centering of the valve cage relative to the valve seat is accomplished by the connection portion.

In particular, the fit is a clearance fit of H/h up to a maximum clearance of 0.05 mm.

This embodiment according to the invention results both in protection through improved sealing at the end of the valve seat facing the valve cage in the first connection portion, and in centering between the valve cage and valve seat as the valve seat is screw-fitted into the valve cage. Because the valve seat can be screwed into the valve cage up to the point where the respective shoulders of the valve seat and the valve cage are pressed against one another, this ensures axial sealing.

This results in improved protection of the thread on either side and at the same time also ensures sealing of the transition between the inlet and outlet side of the valve via the transition between the valve seat and the valve cage. Because, in accordance with the invention, the thread is hardly exposed to the process fluid any more, the connection between the valve cage and valve seat can be unscrewed more easily, even after the use of aggressive media.

In particular, the connection portion of the valve seat is located on the side of the threaded portion facing the valve cage.

In particular, the end of the valve seat facing the valve cage is chamfered around its outer diameter. This facilitates the introduction of the valve seat into the valve cage as the two components are screw-fitted together.

Preferably, the fit is selected such that there is a connection. This reliably centers the valve seat relative to the valve cage and consequently affords protection of the thread.

According to another preferred embodiment, the wall thickness of the valve seat is less in the connection portion than in the screw-connection portion. As a result, the pressure prevailing within the valve seat and cage assembly affects the connection portion in such a way that the latter is urged radially outwards, thus reducing the gap and increasing protection in the connection portion.

The inner diameter of the connection portion can be adapted to the subsequent inner diameter of the valve cage in such a way that the two have the same inner diameter. Since the axial stop of the connection portion is located beyond the screw connection portion, this results in a gap between the valve cage and the connection portion. Because the cross-section of the through-hole is considerably larger than the cross-section of the gap, the resulting Venturi effect will prevent the process fluid from penetrating into the gap as it flows through the valve.

According to yet another preferred embodiment, the valve cage and/or the valve seat can have a sealing portion in which a discrete circumferential sealing element is disposed in order to provide sealing between the valve cage and the valve body in the transition portion.

In accordance with yet another preferred embodiment, the valve cage can be designed to have a reduced wall thickness in its sealing region where it is radially recessed inwardly from its outer wall, so that the discrete sealing element engages around the valve cage. Reducing the wall thickness of the valve cage creates a free area in the transition portion between the valve cage and the valve housing, which is delimited in the axial direction by the valve cage on the one side and by the valve seat on the other, with the portion of the valve seat which delimits the free space for the sealing element being referred to as the sealing shoulder. This free space is where the discrete sealing element is fitted, the inner diameter of which is adapted to the outer diameter in the region of the reduced wall thickness. The sealing element provides sealing between the valve cage and the valve body. The discrete sealing element is delimited in the axial direction by the valve cage and the valve seat. As a result, it can be inserted into, and removed from, the valve housing together with the valve seat and the valve cage.

In this case, the sealing shoulder can be formed by the shoulder of the valve seat, which shoulder provides axial sealing together with the valve cage. In this case, the valve seat has an annular contact surface, which, in a radially outer area thereof, delimits the free space for the sealing element, and, in a radially further inward area thereof, abuts on the valve cage.

According to a further embodiment, the sealing shoulder can also be formed adjacent to a clearance in the valve seat which is formed by a recess from an outer diameter that is adapted to the valve body in the transition portion to a smaller outer diameter to produce a clearance. The outside diameter in the clearance is adapted to the inner diameter of the sealing element so as to enable the discrete sealing element to be accommodated between the valve body and the valve seat.

Both the valve seat and the valve cage can have a clearance that is adapted to the sealing element in such a way that in parts, the sealing element will bear radially against both the valve seat and the valve cage.

Furthermore, the sealing element can have a first inner diameter which corresponds to the diameter that is adapted to the diameter of the valve cage in the recessed region and which has an additional flange-like portion that extends into a region formed by the recessed shoulder located in the valve seat, which shoulder has a smaller outer diameter than the diameter of the recessed portion of the valve cage.

As a result, the flange-like sealing portion can serve as an axial seal between the valve cage and the valve seat because the flange-like portion will be compressed between the valve cage and the valve seat.

The sealing element is of annular design and in particular U- or V-shaped in cross-section. The opening can either be positioned so as to face in the direction of the valve cage or to face away from the valve cage. This position is determined depending on whether the valve is designed for a so-called flow to close (FTC) or a flow to open (FTO) application. The opening in this case is directed against the direction of flow.

According to another aspect of the invention, the latter relates to a valve comprising a valve cover and a valve housing, the valve housing having an inlet and an outlet port and a transition portion with a central recess between the inlet port and the outlet port, with a valve seat and cage assembly of the aforementioned type being accommodated in the valve housing.

The valve cage is arranged in the valve housing in such a way that the transition portion of the valve housing overlaps the sealing region, with a piston being guided within the valve cage, which piston is adapted to assume a sealing position together with the valve seat.

Preferably the valve cage is screw-connected to a retaining ring which latter in turn is screw-fitted to the valve housing. As a result, the retaining ring will act to center and retain the valve cage in such a way that the sealing region of the valve seat and cage assembly will be disposed in the transition portion of the valve housing.

In addition, a shoulder may be formed in the valve housing in the area of its transition portion. The end of the valve seat facing away from the valve cage can be supported axially by this shoulder, thus allowing the valve seat and cage assembly to be clamped in place between the shoulder and a valve housing cover.

The shoulder may also serve as a protection against the seat becoming loose, if the valve cage is connected by means of an above described retaining ring in such a way that it will project into the recess of the transition portion of the valve housing.

The valve seat and cage assembly can be clamped in place directly by the valve cover, for example, or by means of a retaining ring screwed into the valve housing.

As the valve is intended for extreme temperature applications, the valve in particular has a valve housing in which the distance between the valve seat and the valve cover is more than 4 times the diameter of the transition portion.

Additional advantages, features and possible applications of the present invention may be gathered from the description which follows, in which reference is made to the embodiments illustrated in the drawings.

Throughout the description, claims and drawings, those terms and associated reference signs are used as are indicated in the list of reference signs below. In the drawings, FIG. 1 is a sectional view of a valve according to the invention, FIG. 2 is an enlarged detail view of a valve seat and cage assembly in a valve, according to a first embodiment;

Figure 6A:
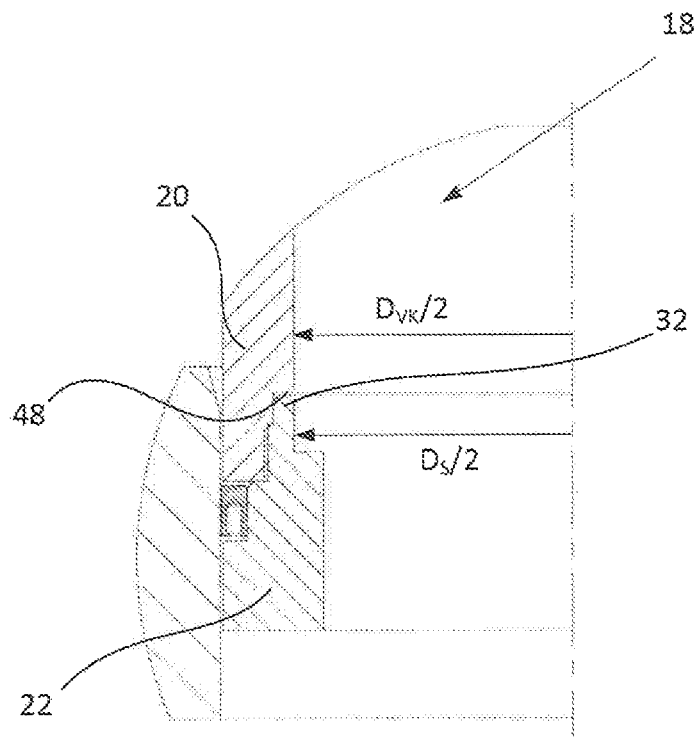
Figure 6B:
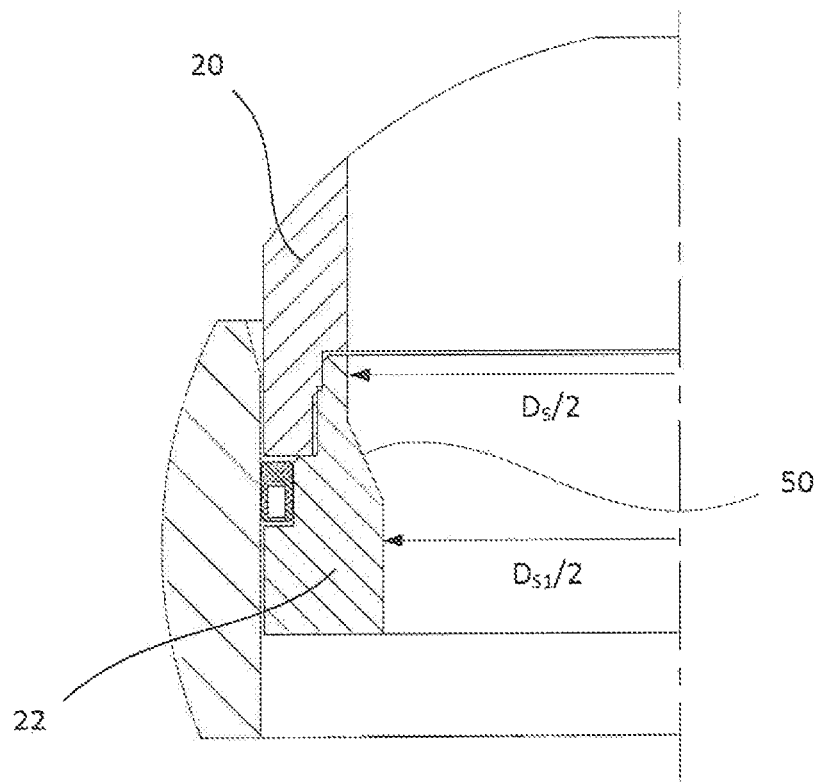

FIG. 6*a* is an enlarged detail view of a valve seat and cage assembly in a valve, according to a fifth embodiment; and FIG. 6*b* is an enlarged detail view of a valve seat and cage assembly in a valve, according to a sixth embodiment similar to the one of FIG. 6*a*.

Figure 1:
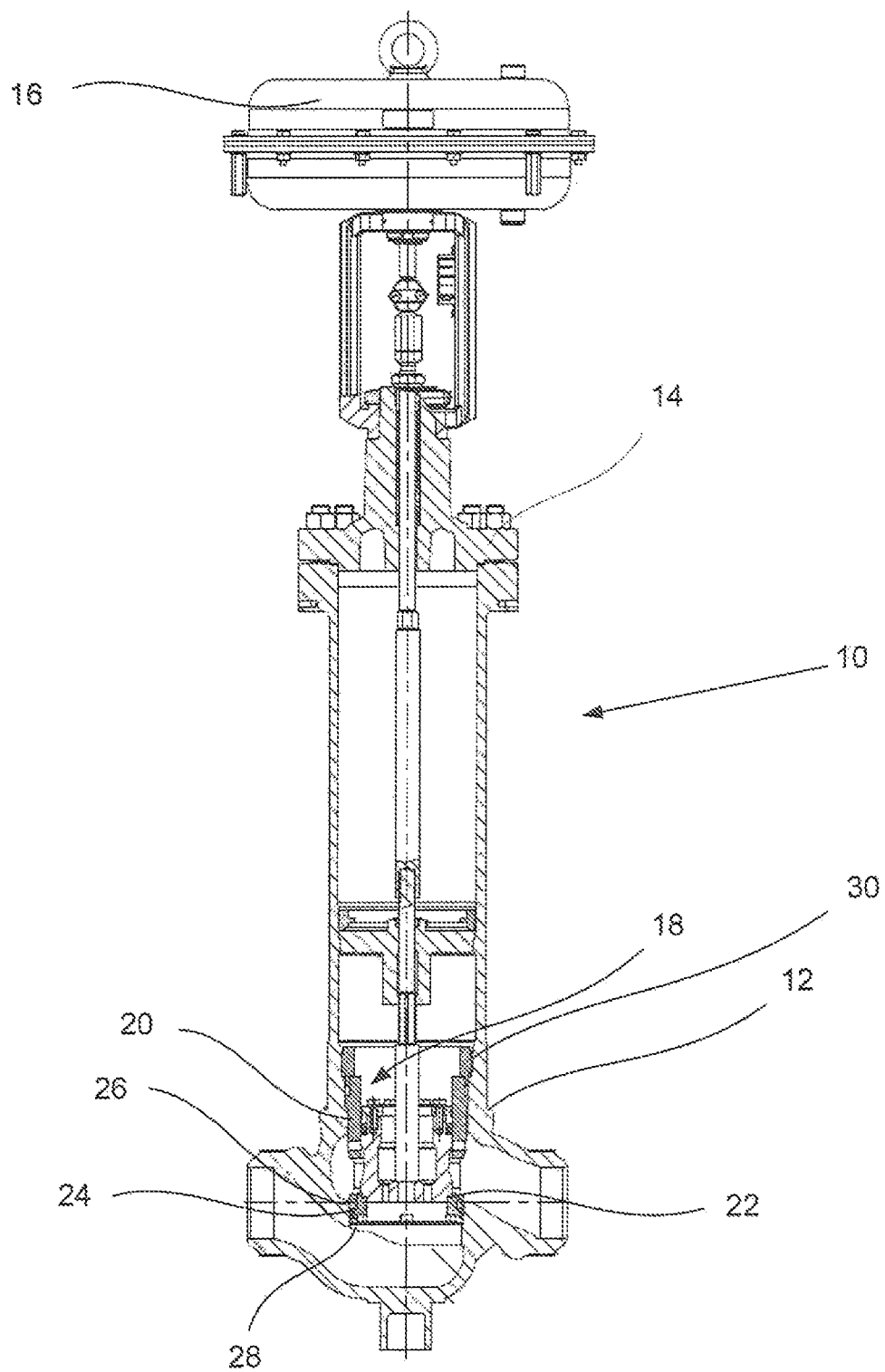

The view of FIG. 1 is a valve 10 according to the invention, which comprises a valve housing 12, a valve cover 14 and an actuator 16. A valve seat and cage assembly 18 according to the invention is fitted in the valve 10.

The valve seat and cage assembly 18 comprises a valve cage 20, a valve seat 22 and a discrete sealing ring 24. The valve housing 12 has a transition portion 26 in the transition from its outlet to its inlet side. The transition portion 26 circumferentially extends around both the valve cage 20 and the valve seat 22. The valve seat and cage assembly 18 is supported on a housing shoulder 28, which is formed in the transition portion of the valve housing 12, and is held in position by a clamping screw 30. FIG. 1 shows a valve 10 that is used for extreme temperature process fluid applications. In the direction of the actuator 16, the valve body 12 therefore extends over a large area, so that the distance between the actuator 16 and the transition portion is in particular at least four times the diameter of the transition portion.

The valve seat and cage assembly will be described in more detail with reference to the figures which follow. The same reference signs are used to designate identical components even if the latter relate to different embodiments.

Figure 2:
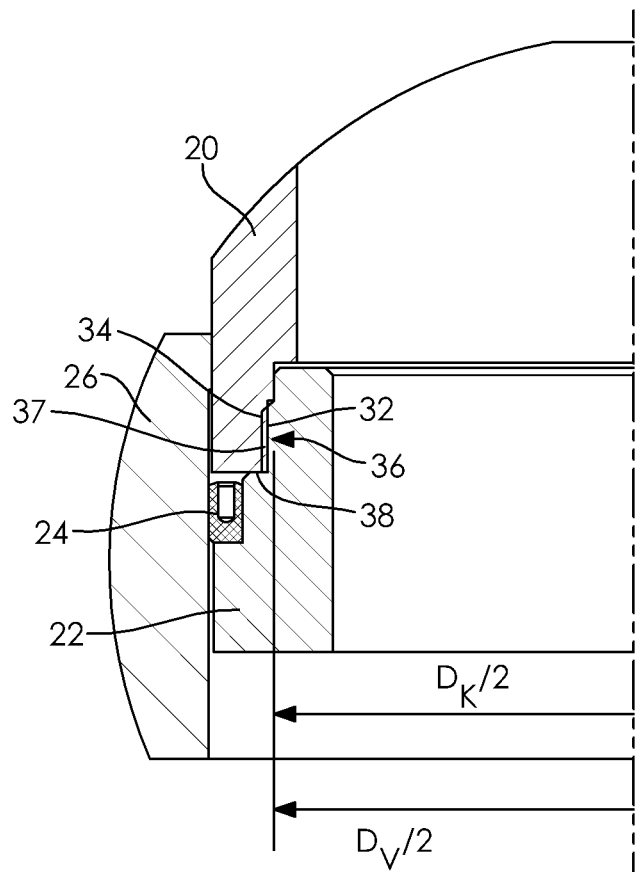

FIG. 2, for example, is an enlarged view of the transition portion 26 and the embodiment of the valve housing 12 used there, as well as of sections of the valve cage 20, the valve seat 22 and the sealing ring 24. The detailed embodiment is explained in more detail below.

The valve cage 20 and the valve seat 22 each have a connection portion, which portions mate with one another in the assembled state. In its connection portion 32, the valve cage 20 for example has a valve cage connection inner diameter $D_K$. Matched to this, the connection portion 34 of the valve seat has a valve seat connection outer diameter $D_V$. $D_K$ and $D_V$ are matched to each other in such a way that there will be a clearance fit between the valve cage 20 and the valve seat 22 in the connection portion 32, 34. In addition, the valve cage 20 and the valve seat 22 have a corresponding thread 36 in the screw connection portion 37, so as to enable the valve seat 22 to be screw-connected to the valve cage 20. The thread 36 is between the connection portion 32, 34 and a shoulder 38 with which the valve seat 22 bears against the valve cage 20 and forms an axial stop. This arrangement connects the valve seat 22 with the valve cage 20, once screw-fitted together, in such a way that firstly a radial seal is created with a gap of 0 mm to 0.05 mm in the connection portion 32, 34 and secondly an axial seal is created between the shoulder 38 and the valve cage 20. As a result, the thread 36 is sealed on either side against process fluid. This reduces contamination of, or damage to, the thread 36.

The valve cage 20 and the valve seat 22 essentially have the same outer diameter, and their insertion portion is inserted into the transition portion of the housing. There is a recess in the valve seat 22 relative to its maximum outside diameter, which recess creates a circumferential free space in the area of the valve seat 22. A sealing ring 24 is disposed in this free space. The sealing ring 24 is U-shaped in cross section and, in the example shown here, its opening faces in the direction of the valve cage 20. This effectively seals the transitional passage between the transition portion 26 of the valve housing and the valve seat and cage assembly 18 in order to prevent leakage between the inlet and outlet areas.

Figure 3:
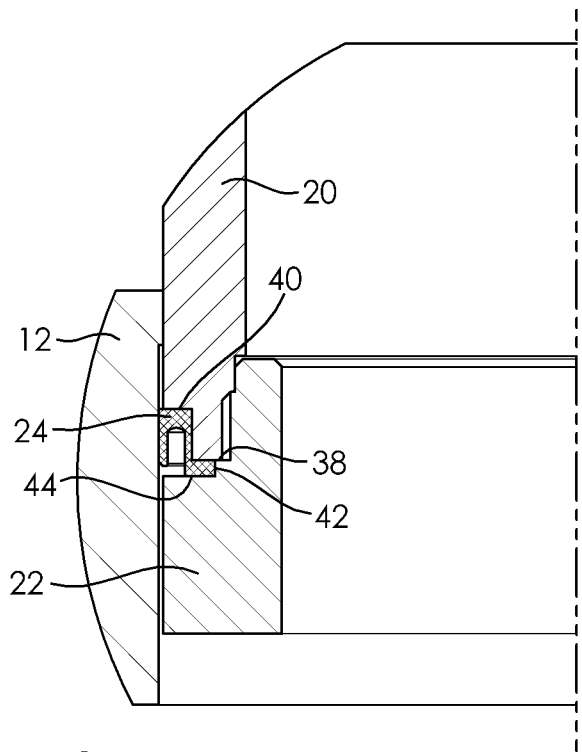
FIG. 3 is an enlarged detail view of a valve seat and cage assembly in a valve, according to a second embodiment.

FIG. 3 illustrates another embodiment of a valve seat and cage assembly 18 according to the invention. In contrast to FIG. 2, the valve cage 20 of this embodiment has a recess 40 so that the seal 24 can be accommodated between the valve cage and the valve housing 12. In this special embodiment, the seal 24 has a flange-like collar 42 that extends radially towards the inside. The valve seat 22 has a shoulder 38 bearing against the valve cage 20, as well as another shoulder, i.e. a sealing shoulder 44, axially spaced therefrom, which shoulder 44 holds the flange-like collar 42 of the sealing ring 24 between the valve seat 22 and the valve cage 20. This, for one thing, fixes the sealing ring 24 not only in a radial direction but also in an axial direction, and, for another, provides improved sealing of the transition between the valve cage 20 and the valve seat 22. The opening of the sealing ring 24 faces in the direction of the valve seat.

Figure 4:
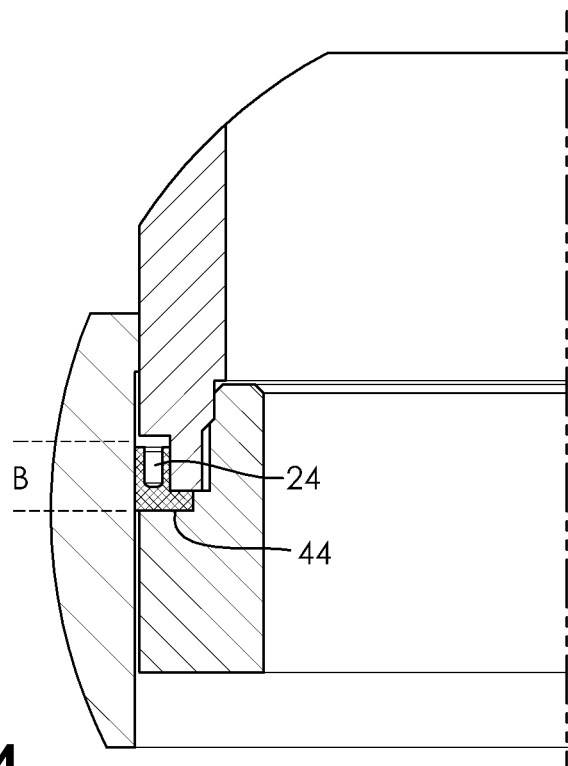
FIG. 4 is an enlarged detail view of a valve seat and cage assembly in a valve, according to a third embodiment.

FIG. 4 is a view of essentially the same embodiment as the one of FIG. 3, but with the opening of the sealing ring 24 facing in the direction of the valve cage 20. FIG. 4, as well as the other FIGS. 2 to 5, shows the chamfer 46 at the end of the connection portion 34 of valve seat 22. This facilitates the process of mating the connection portions 32, 34.

Figure 5:
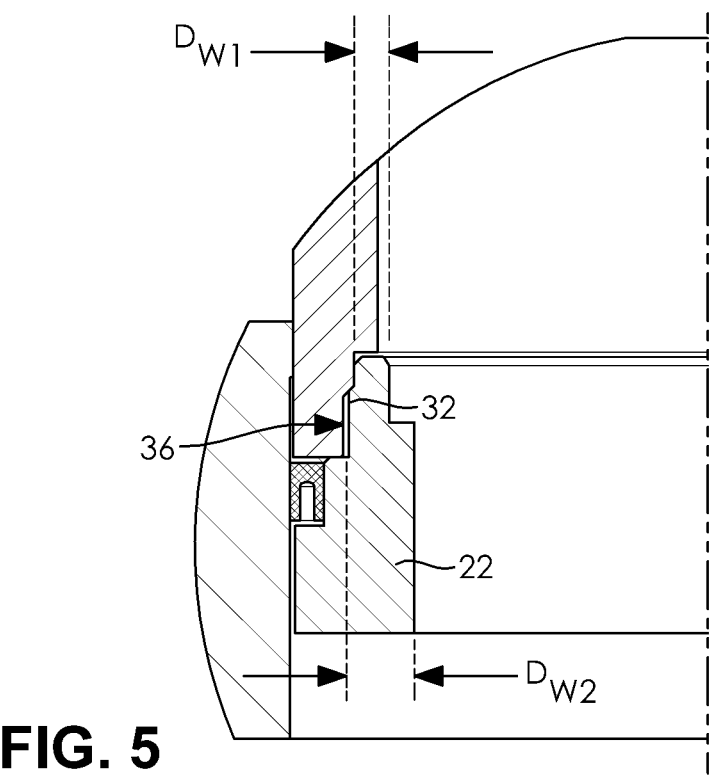
FIG. 5 is an enlarged detail view of a valve seat and cage assembly in a valve, according to a fourth embodiment.

The view of FIG. 5 is an embodiment similar to the one of FIG. 2. Contrary to FIG. 2, however, the connection portion 32 of the valve seat 22 of FIG. 5 has a smaller wall thickness $D_{W1}$ than the wall thickness $D_{W2}$ of the threaded portion in the region of the thread 36. As a result of this embodiment, the pressure of the process fluid inside the valve seat 22 will urge the connection portion 32 radially outwards, which thus further improves the sealing effect in the connection portion 32, 34.

The views of FIG. 6a and FIG. 6b illustrate a similar embodiment of a valve seat and cage assembly 18 according to the invention, in which the connection portion 32 of the valve seat 22 in the transition to the valve cage has an inner diameter $D_S$ that is approximately equal to the valve cage inner diameter $D_{VK}$ in the region adjacent to the connection portion. Owing to the stop, a gap 48 is formed between the valve seat and the valve cage. Because the inner diameters $D_S$ and $D_{VK}$ are matched to one another, this results in the Venturi effect, which means that, in the open state of the valve, process fluid can only penetrate the gap with difficulty, since the size of the gap is very small compared to the diameter $D_{VK}$.

The embodiment illustrated in FIG. 6b has a conical transition 50 from a first inner diameter $D_{S1}$ of the valve seat 22 to the inner diameter $D_S$ provided in the connection portion 32. This has an advantageous effect on the flow behavior of the process fluid in the transition region.

LIST OF REFERENCE SIGNS

10 Valve
12 Valve housing
14 Valve cover
16 Actuator
18 Valve seat and cage assembly
20 Valve cage
22 Valve seat
24 Sealing element
26 Transition portion
28 Housing shoulder
30 Clamping screw
32 Valve seat connection portion
34 Valve cage connection portion
36 Thread
37 Screw-connected portion
38 Shoulder
40 Recess
42 Collar
44 Sealing shoulder
46 Chamfer
$D_K$ Inner diameter of valve cage connection
$D_V$ Outer diameter of valve cage connection
$D_{W1}$ Wall thickness of connection portion
$D_{W2}$ Wall thickness of threaded portion
E Mating portion

The invention claimed is:
1. Valve seat and cage assembly (18), comprising:
a valve cage (20) and a valve seat (22);
said valve seat (22) is threaded (36) into said valve cage (20);
said valve cage (20) includes a threaded connection portion (34);
said valve cage (20) threaded connection portion (34) has an inner diameter (DK);
said valve seat (22) includes a threaded connection portion (32);
said valve seat (22) threaded connection portion (32) includes an outer diameter (DV);
said inner diameter (DK) of said valve cage threaded connection portion (34) is threaded to said outer diameter (DV) of said threaded connection portion (32) of said valve seat (22) forming a threaded connection portion (37) which thus provides radial centering;
said valve seat (22) includes a first sealing shoulder (38) engaging said valve cage (20) acting as an axial stop and acting as a metal to metal seal between said valve cage (20) and said valve seat (22);

said valve seat (22) includes a second sealing shoulder (44) adjoining and axially spaced from said first sealing shoulder (38);

a recess (40), said recess has a first portion formed between said second sealing shoulder (44) and said valve seat (22), and, a second portion formed wherein said valve cage (20) has an outer wall and a portion of said outer wall of said valve cage (20) has a reduced wall thickness radially recessed inwardly from said outer wall of said valve cage (20);

a seal (24) resides in said recess (40), said seal (24) includes a first portion in the form of a flange-like collar (42) extending radially inwardly toward said metal to metal seal between said valve cage (20 and said valve seat (22), said second sealing shoulder (44) holds said flange-like collar (42) of said seal (24) between said valve seat (22) and said valve cage (20) thus fixing said seal (24) in said first portion of said recess thus fixing said seal (24) radially and axially;

said seal (24) further includes a second portion thereof having an opening which extends between said second portion of said recess (40) formed wherein said valve cage (20) has an outer wall and a portion of said outer wall of said valve cage (20) has a reduced wall thickness radially recessed inwardly from said outer wall of said valve cage (20);

said valve seat (22) and said valve cage (20) being pressed against one another with an axial contact pressure force component;

said threaded connection portion (37) is located between said threaded connection portion (32) of said valve seat (22), said threaded connection portion (34) of said valve cage (20), and said shoulder (38) of said valve seat (38); and, said valve cage (20) connection portion (34) inner diameter (DK) and said valve seat (22) connection portion (32) outer diameter (DV) forming a fit with one another that acts to center said valve seat (22) and said valve cage (20).

2. Valve (10), comprising a valve cover (14), a valve housing (12), which valve housing (12) has an inlet connection and an outlet connection, and a transition portion (26) with a central recess between said inlet connection and said outlet connection, with a valve seat and cage assembly (18), comprising:

a valve cage (20) and a valve seat (22);

said valve seat (22) is threaded (36) into said valve cage (20);

said valve cage (20) includes a threaded connection portion (34);

said threaded connection portion (34) of said valve cage (20) has an inner diameter (DK);

said valve seat (22) includes a threaded connection portion (32);

said threaded connection portion (32) of said valve seat (22) includes an outer diameter (DV);

said inner diameter (DK) of said valve cage (20) threaded connection portion (34) is threaded (36) to said outer diameter (DV) of said valve seat (22) threaded connection portion (32) forming a threaded connection portion (37) which thus provides radial centering of said valve seat (22) and said valve cage (20);

said valve seat (22) includes a shoulder (38) engaging said valve cage (20) acting as an axial stop and a metal to metal seal between said valve cage (20) and said valve seat (22);

said valve seat (22) and said valve cage (20) being pressed against one another with an axial contact pressure force component;

said threaded connection portion (37) is located between said threaded connection portion (32) of said valve seat (22) and said shoulder (38);

a recess (40), said recess has a first portion formed between said second sealing shoulder (44) and said valve seat (22), and, a second portion formed wherein said valve cage (20) has an outer wall and a portion of said outer wall of said valve cage (20) has a reduced wall thickness radially recessed inwardly from said outer wall of said valve cage (20);

a seal (24) resides in said recess (40), said seal (24) includes a first portion in the form of a flange-like collar (42) extending radially inwardly toward said metal to metal seal between said valve cage (20 and said valve seat (22), said second sealing shoulder (44) holds said flange-like collar (42) of said seal (24) between said valve seat (22) and said valve cage (20) thus fixing said seal (24) in said first portion of said recess thus fixing said seal (24) radially and axially;

said seal (24) further includes a second portion thereof having an opening which extends between said second portion of said recess (40) formed wherein said valve cage (20) has an outer wall and a portion of said outer wall of said valve cage (20) has a reduced wall thickness radially recessed inwardly from said outer wall of said valve cage (20);

said valve cage (20) threaded connection (34) inner diameter (DK) and said valve seat (22) threaded connection (32) outer diameter (DV) centering said valve seat (22) and fitted in said valve housing (12) such that said transition portion (26) of said valve housing (12) overlaps said seal (24); and, a piston guided within said valve cage (20), said piston being adapted to assume a sealing position together with said valve seat (22).

3. Valve seat and cage assembly according to claim 1, characterized in that said fit between said valve cage (20) threaded connection portion (34) inner diameter (DK) and said valve seat (22) threaded connection portion (22) outer diameter (DV) is a clearance fit and has a maximum clearance of 0.05 mm.

4. Valve seat and cage assembly according to claim 1, characterized in that the threaded connection portion (32) of said valve seat (22) is arranged on the side of said threaded connection portion (37) that faces said valve cage (20).

5. Valve seat and cage assembly according to claim 1, characterized in that the wall thickness (DW1) of said valve seat (22) in the threaded connection portion is smaller than the wall thickness (DW2) in said threaded connection portion (37).

6. Valve seat and cage assembly according to claim 1, characterized in that the sealing element (24) is U- or V-shaped in cross-section, and has an opening thereof facing in the direction of the valve cage (20).

7. Valve seat and cage assembly according to claim 1, characterized in that said seal (24) is U- or V-shaped and has an opening thereof facing away from said valve cage (20).

8. Valve seat and cage assembly according to claim 1, characterized in that said threaded connection portion (32) of said valve seat (22) in the transition to said valve cage (20) has an inner diameter (DS) which corresponds approximately to the inner diameter (DVK) of said valve cage (20).

9. Valve according to claim 2, characterized in that the valve housing (12) has a housing shoulder (28) in the region of said transition portion (26) on which said valve seat (22) is supported in the axial direction, said valve seat and cage assembly (18) are clamped in place between said housing shoulder (28) and a valve housing cover (14).

10. Valve according to claim 2, characterized in that said seal (24) is fitted between said valve seat and cage assembly (18) and said transition portion (26).

11. Valve seat and cage assembly according to claim 2, characterized in that the sealing element (24) is U- or V-shaped in cross-section, and has an opening thereof facing in the direction of the valve cage (20).

12. Valve seat and cage assembly according to claim 2, characterized in that said seal (24) is U- or V-shaped and has an opening thereof facing away from said valve cage (20).

* * * * *